United States Patent
Cheng et al.

(10) Patent No.: US 12,202,361 B2
(45) Date of Patent: Jan. 21, 2025

(54) MOTOR DRIVE SYSTEM, POWER SYSTEM, AND ELECTRIC VEHICLE

(71) Applicant: Huawei Digital Power Technologies Co., Ltd., Shenzhen (CN)

(72) Inventors: Yang Cheng, Xi'an (CN); Chunyang Liu, Xi'an (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 283 days.

(21) Appl. No.: 17/889,695

(22) Filed: Aug. 17, 2022

(65) Prior Publication Data

US 2023/0075867 A1  Mar. 9, 2023

Related U.S. Application Data

(63) Continuation of application No. PCT/CN2020/075643, filed on Feb. 18, 2020.

(51) Int. Cl.
*B60L 53/22* (2019.01)
*H02P 27/06* (2006.01)

(52) U.S. Cl.
CPC .............. *B60L 53/22* (2019.02); *H02P 27/06* (2013.01); *B60L 2210/40* (2013.01); *H02J 2310/48* (2020.01)

(58) Field of Classification Search
CPC ........ H02P 27/08; H02P 25/22; H02P 29/028; H02P 25/18; F25B 31/02; B60L 58/20;
(Continued)

(56) References Cited

U.S. PATENT DOCUMENTS

2012/0217849 A1  8/2012  Aoki et al.
2017/0070175 A1  3/2017  Butzmann et al.
(Continued)

FOREIGN PATENT DOCUMENTS

CN  103434415 A  12/2013
CN  105539156 A  5/2016
(Continued)

OTHER PUBLICATIONS

Yu et al. (CN 110239350 A) (Year: 2019).*

*Primary Examiner* — Said Bouziane
(74) *Attorney, Agent, or Firm* — WOMBLE BOND DICKINSON (US) LLP

(57) ABSTRACT

This application provides a motor drive system, a power system, and an electric vehicle, and relates to the field of power electronic technologies. The drive system is configured to drive a motor that uses a power battery pack as a power supply. The power battery pack includes at least two battery modules that are independent of each other, the drive system includes at least two direct current-alternating current DC-AC circuits, and the battery modules one-to-one correspond to the DC-AC circuits. Each battery module is correspondingly connected to an input end of one DC-AC circuit, and an output end of each DC-AC circuit is connected to a corresponding winding of the motor. The DC-AC circuit is configured to convert a direct current provided by the corresponding battery module into an alternating current to drive the corresponding winding of the motor.

19 Claims, 9 Drawing Sheets

(58) Field of Classification Search
CPC .......... B60L 50/16; B60L 50/40; B60L 58/21; B60L 15/007; B60L 50/51; B60L 15/2045; B60L 7/14; B60L 58/18; B60L 50/10

See application file for complete search history.

(56) References Cited

U.S. PATENT DOCUMENTS

| | | | |
|---|---|---|---|
| 2018/0065491 A1 | 3/2018 | King et al. | |
| 2019/0229670 A1 | 7/2019 | Arisawa et al. | |
| 2019/0299808 A1* | 10/2019 | Oyama | B60L 58/22 |

FOREIGN PATENT DOCUMENTS

| | | | | |
|---|---|---|---|---|
| CN | 106068202 | A | | 11/2016 |
| CN | 107128185 | A | | 9/2017 |
| CN | 107499165 | A | | 12/2017 |
| CN | 110239350 | A | * | 9/2019 |
| JP | H0787604 | A | | 3/1995 |
| JP | 2009177899 | A | | 8/2009 |
| JP | 2019068575 | A | | 4/2019 |

* cited by examiner

MOTOR DRIVE SYSTEM, POWER SYSTEM, AND ELECTRIC VEHICLE

CROSS-REFERENCE TO RELATED APPLICATIONS

This application is a continuation of International Application No. PCT/CN2020/075643, filed on Feb. 18, 2020, the disclosure of which is hereby incorporated by reference in its entirety.

TECHNICAL FIELD

This application relates to the field of power electronic technologies, and in particular, to a motor drive system, a power system, and an electric vehicle.

BACKGROUND

With intensified energy shortage and environmental pollution in modern society, electric vehicles have received extensive attention from all walks of life. A motor of the electric vehicle is driven by using a vehicle-mounted power battery pack as a power supply, so that the motor drives wheels of the vehicle to rotate, and then drives the vehicle to travel.

FIG. 1 is a schematic diagram of a motor drive system. The motor drive system includes a power battery pack 101, a DC-AC (direct current-alternating current) circuit 102, and a motor 103. The power battery pack 101 includes a plurality of batteries connected in series and in parallel. For example, the batteries may be first connected in parallel, and then connected in series. The DC-AC circuit can convert a direct current output by the power battery pack 101 into an alternating current, and provide the alternating current for the motor 103.

When some batteries in the power battery pack 101 are faulty, a protection system of the electric vehicle is triggered, and the protection system controls the power battery pack to stop supplying power to the DC-AC circuit 102. Consequently, the electric vehicle stops and cannot continue to travel.

SUMMARY

To resolve the foregoing technical problem, embodiments of this application provide a motor drive system, a power system, and an electric vehicle. In this way, a vehicle can continue to travel when some batteries in a power battery pack are faulty.

In some embodiments, this application provides a motor drive system, configured to drive a motor that uses a power battery pack as a power supply. The power battery pack includes at least two battery modules that are independent of each other, the drive system includes at least two direct current-alternating current DC-AC circuits, and the battery modules one-to-one correspond to the DC-AC circuits. Each battery module is correspondingly connected to an input end of one DC-AC circuit, and an output end of each DC-AC circuit is connected to a corresponding winding of the motor. The DC-AC circuit converts a direct current provided by the corresponding battery module into an alternating current to drive the corresponding winding of the motor.

The power battery pack is divided into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding.

In some embodiments, the drive system further includes a vehicle control unit, a primary controller, and a secondary controller. Each DC-AC circuit is corresponding to one secondary controller. When it is determined that a battery module is faulty, the vehicle control unit sends a disable instruction to a secondary controller corresponding to the faulty battery module by using the primary controller, so that the secondary controller receiving the disable instruction controls a corresponding DC-AC circuit to stop working.

In some embodiments, each DC-AC circuit corresponds to one secondary controller. In other words, a quantity of the secondary controllers is the same as a quantity of the DC-AC circuits. When determining that a battery module is faulty, the vehicle control unit can send a disable instruction to a secondary controller corresponding to the faulty battery module by using the primary controller, so that the secondary controller receiving the disable instruction controls a corresponding DC-AC circuit to stop working. Impact caused by the fault is reduced and fault isolation is implemented. In addition, another battery module that supplies power normally can continue to supply power to a corresponding motor winding. In this way, the electric vehicle can continue to travel.

In some embodiments, the drive system further includes a vehicle control unit and a primary controller. When it is determined that a battery module is faulty, the vehicle control unit sends a disable instruction to the primary controller, and the disable instruction carries an ID of the faulty battery module. When receiving the disable instruction, the primary controller controls, based on the ID of the faulty battery module, a DC-AC circuit corresponding to the faulty battery module to stop working.

In some embodiments, impact caused by the fault can be reduced, fault isolation can be implemented, and a DC-AC circuit corresponding to another battery module that works normally can work normally. In this way, a vehicle can continue to travel, facilitating vehicle rescue. Therefore, redundancy of the drive system is further improved. In addition, a circuit structure is simplified and costs are reduced because no secondary controller is needed.

In some embodiments, the drive system further includes a vehicle control unit and a primary controller. When it is determined that a battery module is faulty, the primary controller is configured to control a DC-AC circuit corresponding to the faulty battery module to stop working, and send fault information of the faulty battery module to the vehicle control unit. The vehicle control unit is configured to display the fault information on a display.

In some embodiments, when it is determined that a battery module is faulty, the primary controller can control a corresponding DC-AC circuit to stop working, to reduce impact caused by the fault and implement fault isolation. In addition, a DC-AC circuit corresponding to a battery module that works normally can be controlled to continue working, so that another battery module that works normally can continue to supply power to a corresponding motor winding, facilitating vehicle rescue. Therefore, redundancy of the drive system is further improved. In addition, a circuit structure is simplified and costs are reduced because no secondary controller is needed.

In some embodiments, the drive system further includes a vehicle control unit, a primary controller, and a secondary controller. Each DC-AC circuit corresponds to one secondary controller. When it is determined that a battery module is faulty, the primary controller sends a disable instruction to a secondary controller corresponding to the faulty battery module, so that the secondary controller receiving the disable instruction controls a corresponding DC-AC circuit to stop working. In addition, fault information of the faulty battery module is sent to the vehicle control unit.

In some embodiments, impact caused by the fault can be reduced, fault isolation can be implemented, and a DC-AC circuit corresponding to a battery module that works normally can be controlled to continue to work, so that another battery module that works normally can continue to supply power to a corresponding motor winding, facilitating vehicle rescue. Therefore, redundancy of the drive system is further improved.

In some embodiments, the vehicle control unit is further configured to obtain a load of the motor, and send a control instruction to the primary controller based on the load. The primary controller is further configured to control a quantity of working DC-AC circuits based on the control instruction, and the quantity of working DC-AC circuits is positively correlated with the load.

Therefore, a quantity of battery modules that supply power can be selected based on a scenario of the electric vehicle. This reduces energy consumption and prolongs an endurance mileage of the power battery pack.

In some embodiments, when it is determined that a winding of the motor is faulty, the primary controller is further configured to control a DC-AC circuit corresponding to the faulty winding to stop working.

Therefore, when a winding of the motor is faulty, a DC-AC circuit corresponding to the faulty winding can be controlled in time to stop working, implementing fault isolation.

In some embodiments, when a winding of the motor is three-phase winding, three phases of each three-phase winding are interlaced with each other at phase angles of 120°.

In some embodiments, when a winding of the motor is three-phase winding, every two adjacent three-phase windings are interlaced at a first preset angle, and a value range of the first preset angle is 0° to 180°. For example, there are three three-phase windings: U1/V1/W1, U2/V2/W2, and U3/V3/W3. When the first preset angle is 60°, a phase angle of the winding U2/V2/W2 may lead a phase angle of the winding U1/V1/W1 by 60°, and a phase angle of the winding U3/V3/W3 may lead the phase angle of the winding U2/V2/W2 by 60°.

In some embodiments, the DC-AC circuit is a two-level three-phase half-bridge circuit, a two-level three-phase full-bridge circuit, or a multi-level circuit.

In some embodiments, when the DC-AC circuit is a two-level three-phase half-bridge circuit, a negative electrode of each battery module is connected to a common reference ground.

In some embodiments, the drive system further includes a charger. When the DC-AC circuit is a two-level three-phase half-bridge circuit, and the negative electrode of each battery module is connected to the common reference ground, a first end of the charger is connected to a common tap of windings of the motor, and a second end of the charger is connected to the common reference ground.

The charger may output a direct-current voltage, and may also output an alternating-current voltage. When the charger outputs a direct current, the charging current flows through the motor winding, the DC-AC circuit, the battery module, the common reference ground, and flows back to the charger.

When the charger outputs an alternating current, a controllable switching transistor in a DC-AC circuit may be controlled to convert a current flowing through the DC-AC circuit into a direct current, and then the direct current is transmitted to a corresponding battery module. In this case, the DC-AC circuit is configured to implement alternating current-direct current conversion, and is equivalent to an inverter.

In a charging process, the battery modules are independent of each other, and the charger can separately charge the battery modules. For a faulty battery module, charging of the faulty battery module may be stopped, and another normal battery module can still be normally charged without being affected. Therefore, redundancy of the drive system is improved.

In some embodiments, this application provides a power system. The power system includes a motor, a power battery pack, and the drive system provided. The power battery pack includes at least two battery modules that are independent of each other, the drive system is configured to drive windings of the motor, and the motor is configured to supply power to a load. The motor includes N windings, a quantity of phases of each of the N windings is 2 or 3, and N is an integer greater than or equal to 2.

The power system divides the power battery pack into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding.

In some embodiments, each winding is correspondingly connected to an output end of one DC-AC circuit.

In some embodiments, when the quantity of phases of each winding is 2, two ends of each phase in each winding are respectively connected to two output ends of each phase in a corresponding DC-AC circuit.

In some embodiments, when the quantity of phases of each winding is 3, a first end of each phase in each winding is correspondingly connected to an output end of each phase in one DC-AC circuit, and a second end of each phase in each winding is connected together.

In some embodiments, a negative electrode of each battery module is connected to a common reference ground. In this case, when a charger is used to charge the power battery pack, one end of the charger is connected to a common tap of windings of a three-phase motor, and the other end is connected to the common reference ground of the battery modules of the drive system.

In some embodiments, when a quantity of the windings of the motor is N times of 3, the windings of the motor may be any one of the following: six-phase windings, nine-phase windings, twelve-phase windings, or fifteen-phase windings.

In some embodiments, this application further provides an electric vehicle, including the power system. The power system divides a power battery pack into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding.

The solutions provided in this application have at least the following advantages.

The power battery pack corresponding to the drive system includes at least two battery modules that are independent of each other. The drive system includes at least two DC-AC circuits, and the battery modules one-to-one correspond to the DC-AC circuits. In other words, a quantity of the battery modules is the same as a quantity of the DC-AC circuits. Each battery module is correspondingly connected to an input end of one DC-AC circuit, and an output end of each DC-AC circuit is connected to one corresponding winding of the motor, that is, the DC-AC circuits one-to-one correspond to each winding of the motor. The DC-AC circuit can convert a direct current provided by the corresponding battery module into an alternating current to drive a winding of the motor. In the solutions of this application, the power battery pack is divided into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding.

DESCRIPTION OF EMBODIMENTS

To enable a person skilled in the art to better understand technical solutions provided in embodiments of this application, the following first describes a motor drive system.

Figure 1:
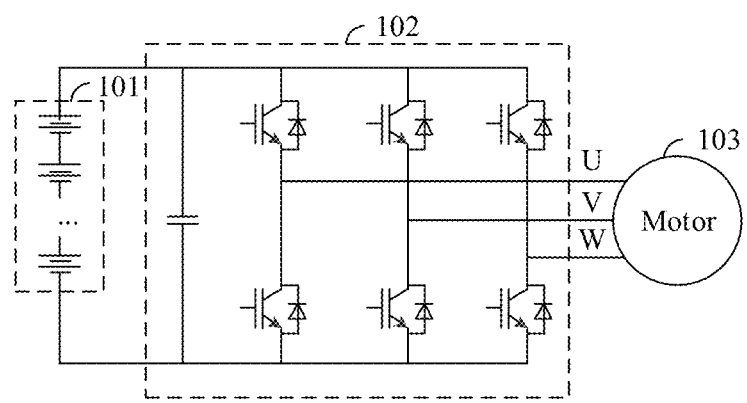
FIG. 1 is a schematic diagram of a motor drive system.

Still refer to the motor drive system shown in FIG. 1. A power battery pack 101 of an electric vehicle includes a plurality of batteries connected in series and in parallel. Generally, the batteries are first connected in parallel, and then connected in series. No switch is disposed inside the power battery pack. Therefore, a high-voltage direct current continuously exists at two ends of the power battery pack, and a voltage range is generally between 200 V and 800 V. A DC-AC circuit 102 can invert a direct current that is output by the power battery pack 101 into an alternating current, and provide the alternating current for a motor 103.

When some batteries in the power battery pack are faulty, a protection system of the electric vehicle is triggered. The protection system controls the power battery pack to stop supplying power to the DC-AC circuit 102, so that the electric vehicle stops. In actual application, the electric vehicle can only passively wait for rescue, but cannot actively travel to a maintenance station.

To resolve the foregoing technical problem, this application provides a motor drive system, a power system, and a drive method. A power battery pack corresponding to the drive system includes at least two battery modules that are independent of each other. The drive system includes at least two DC-AC circuits, and the battery modules one-to-one correspond to the DC-AC circuits. In other words, a quantity of the battery modules is the same as a quantity of the DC-AC circuits. Each battery module is correspondingly connected to an input end of one DC-AC circuit, and an output end of each DC-AC circuit is correspondingly connected to one winding of the motor, that is, the DC-AC circuits one-to-one correspond to each winding of the motor. When a battery module is faulty, normal power supply by another battery module is not affected, and the other battery module that normally supplies power may continue to supply power to a corresponding motor winding. In this way, a vehicle can continue to travel.

To make a person skilled in the art better understand the technical solutions in this application, the following clearly describes the technical solutions in embodiments of this application with reference to the accompanying drawings in embodiments of this application.

It may be understood that terms such as "first" and "second" in embodiments of this application are merely used for ease of description, and do not constitute a limitation on this application.

Drive System Embodiment 1

An embodiment of this application provides a motor drive system, used in an electric vehicle, and configured to drive a motor of the electric vehicle. The electric vehicle includes a power battery pack. The power battery pack may include a plurality of batteries. The plurality of batteries form at least two battery modules that are independent of each other. A quantity of battery modules may be determined based on an actual situation. This is not limited in this embodiment of this application. The following provides descriptions with reference to the accompanying drawings.

Figure 2:
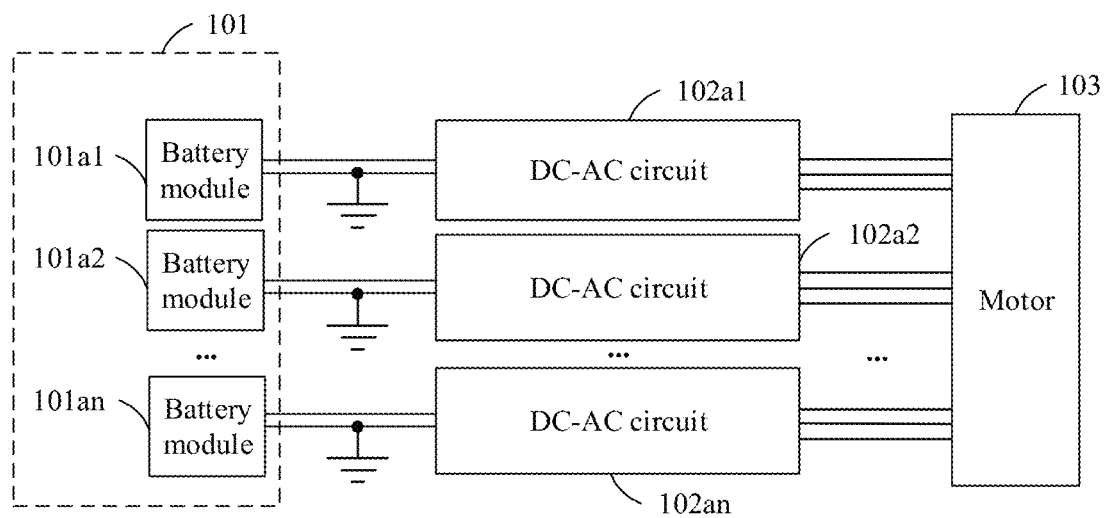
FIG. 2 is a schematic diagram of a motor drive system according to an embodiment of this application.

Refer to FIG. 2. FIG. 2 is a schematic diagram of a motor drive system according to an embodiment of this application.

The drive system includes DC-AC circuits 102$a$1 to 102$an$.

Battery modules are 101$a$1, 101$a$2, . . . , and 101$an$, and the battery modules are independent of each other. n indicates a quantity of the battery modules. For example, when n=2, the power battery pack includes a battery module 101$a$1 and a battery module 101$a$2.

Output voltages of the battery modules may be equal or not equal. In other words, quantities of batteries included in the battery modules may be equal or not equal. This is not limited in this embodiment of this application.

For example, an output voltage of the battery module 101a1 may be 36 V, and an output voltage of the battery module 101a2 may be 24 V.

In actual application, an insulation system between a live metal part of the battery module and a metal part of a vehicle frame may be damaged, or insulation performance may deteriorate (which may be caused by abnormalities such as external force extrusion, collision, or puncture of the battery module in actual application). This may cause uncontrollable discharge of battery energy, electric leakage, or the like. To reduce safety risks, the output voltage of the battery module 101a1 may be set to be not higher than a safe voltage across a human body.

A quantity of the DC-AC circuits is the same as a quantity of the battery modules, and each battery module is correspondingly connected to an input end of one DC-AC circuit. In some embodiments, the battery module 101a1 is connected to the DC-AC circuit 102a1, the battery module 101a2 is connected to the DC-AC circuit 102a2, . . . , and the battery module 101an is connected to the DC-AC circuit 102an.

An output end of each DC-AC circuit is correspondingly connected to a winding of a motor 103, and a quantity of the motor windings is the same as a quantity of the DC-AC circuits.

In FIG. 2, the motor winding being a three-phase winding is used as an example. In this case, a correspondingly connected DC-AC circuit may be a two-level three-phase half-bridge DC-AC circuit, a two-level three-phase full-bridge DC-AC circuit, or a multi-level DC-AC circuit.

The DC-AC circuit is configured to convert a direct current provided by the corresponding battery module into an alternating current to drive a winding of the motor 103.

The battery modules correspondingly connected to the DC-AC circuits are independent of each other. When some battery modules are faulty, normal power supply by another battery module is not affected. In actual application, the DC-AC circuit that is correspondingly connected to the faulty battery module may further stop working, implementing fault source isolation. This prevents escalation of fault impact and reduces an accident risk.

For example, when the battery module 101a1 is faulty, the DC-AC circuit 102a1 correspondingly connected to the battery module 101a1 stops working, so that the faulty battery module 101a1 stops supplying power to the corresponding motor winding.

In this case, another battery module that works normally can continue to supply power to a corresponding motor winding. In this way, the vehicle can continue to travel.

Figure 3:
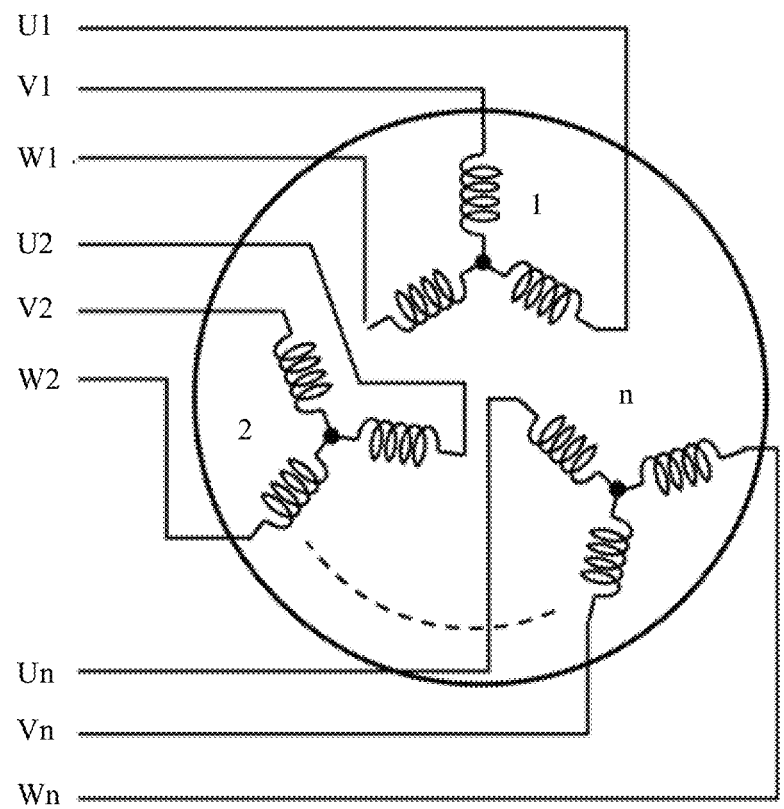
FIG. 3 is a schematic diagram of arrangement of motor windings according to an embodiment of this application.

Refer to FIG. 3. FIG. 3 is a schematic diagram of arrangement of motor windings according to an embodiment of this application.

The arrangement manner of the motor windings shown in the figure corresponds to FIG. 2. A quantity of the windings of the motor is n times of 3, where n is an integer greater than or equal to 2. That is, the motor includes n three-phase windings: U1/V1/W1, U2/V2/W2, . . . , and Un/Vn/Wn. For each three-phase winding, three phases of each three-phase winding are interlaced with each other at phase angles of 120°.

In addition, every two adjacent three-phase windings are interlaced at a first preset angle, and a value range of the first preset angle is 0° to 180°. For example, when n=3 and the first preset angle is 60°, a phase angle of the winding U2/V2/W2 may lead a phase angle of the winding U1N1/W1 by 60°, and a phase angle of the winding U3/V3/W3 may lead the phase angle of the winding U2/V2/W2 by 60°.

A value of the first preset angle may be determined based on an actual situation. This is not limited in this embodiment of this application.

Figure 4:
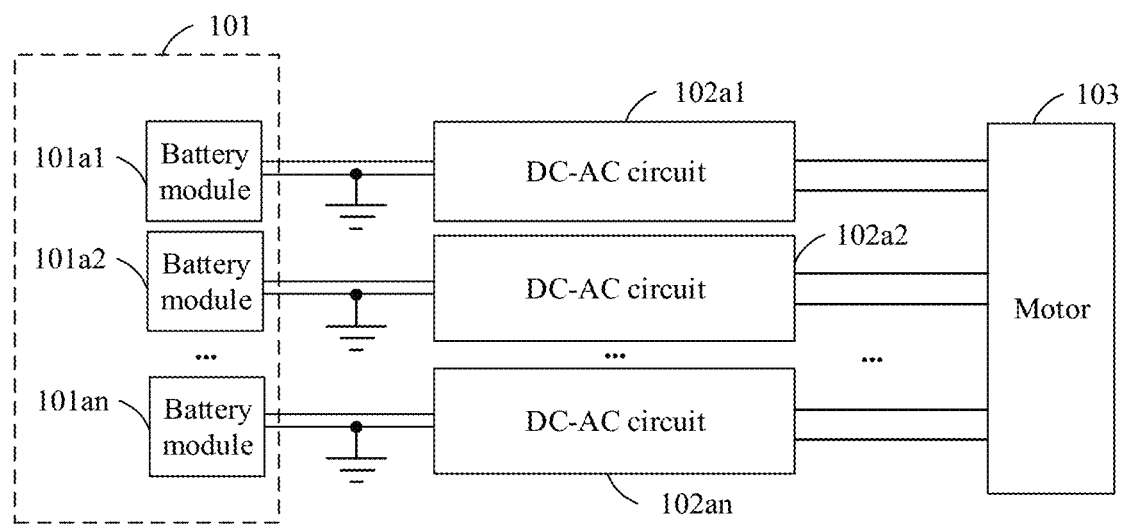
FIG. 4 is a schematic diagram of another motor drive system according to an embodiment of this application.

Refer to FIG. 4. FIG. 4 is a schematic diagram of another motor drive system according to an embodiment of this application.

The drive system shown in FIG. 4 differs from the drive system shown in FIG. 2 in that a winding used by a motor 103 is a two-phase winding. In this case, a correspondingly connected DC-AC circuit may be a DC-AC circuit of a full-bridge structure.

For descriptions of battery modules and a working principle, refer to a corresponding part in the description in FIG. 2. Details are not described herein again.

Figure 5:
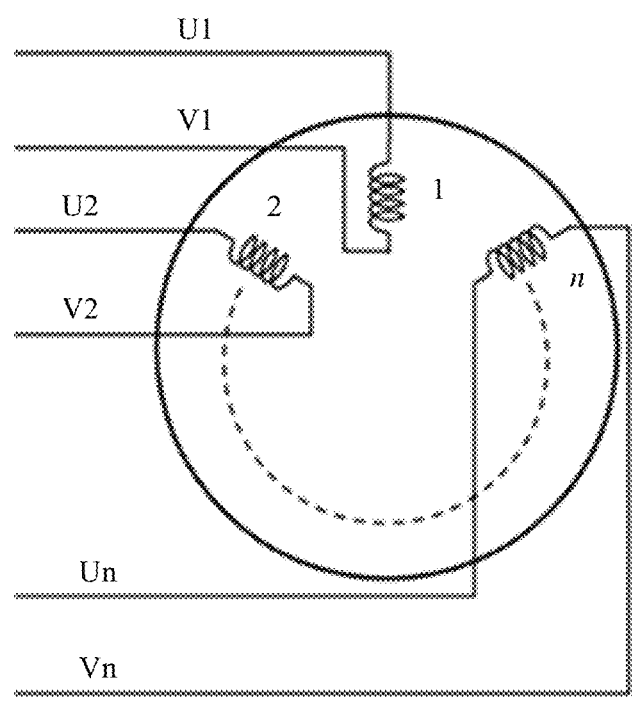
FIG. 5 is a schematic diagram of another arrangement of motor windings according to an embodiment of this application.

Refer to FIG. 5. FIG. 5 is a schematic diagram of another arrangement of motor windings according to an embodiment of this application.

The arrangement manner of the motor windings shown in the figure corresponds to FIG. 4. In this case, a quantity of the windings of the motor is n times of 2, where n is an integer greater than or equal to 2. That is, the motor includes n two-phase windings: U1/V1, U2/V2, and Un/Vn. Both ends of each phase of each winding of the motor are led out and connected to a DC-AC circuit.

In conclusion, the power battery pack corresponding to the drive system provided in this embodiment of this application includes at least two battery modules that are independent of each other. The drive system includes at least two DC-AC circuits, and the battery modules one-to-one correspond to the DC-AC circuits. In other words, a quantity of the battery modules is the same as a quantity of the DC-AC circuits. Each battery module is correspondingly connected to an input end of one DC-AC circuit, and an output end of each DC-AC circuit is correspondingly connected to one winding of the motor, that is, the DC-AC circuits one-to-one correspond to each winding of the motor. The DC-AC circuit can convert a direct current provided by the corresponding battery module into an alternating current to drive a winding of the motor. In the solutions of this application, the power battery pack is divided into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding. In this way, the electric vehicle can continue to travel.

The drive system further includes a component having a control function, and can control a working status of each DC-AC circuit. The following describes an embodiment and a working principle of the component having a control function with reference to the accompanying drawings. In the following embodiment, an example in which the winding of the motor is a three-phase winding is used. It may be understood that a principle is similar when the winding of the motor is a two-phase winding.

Drive System Embodiment 2

Figure 6:
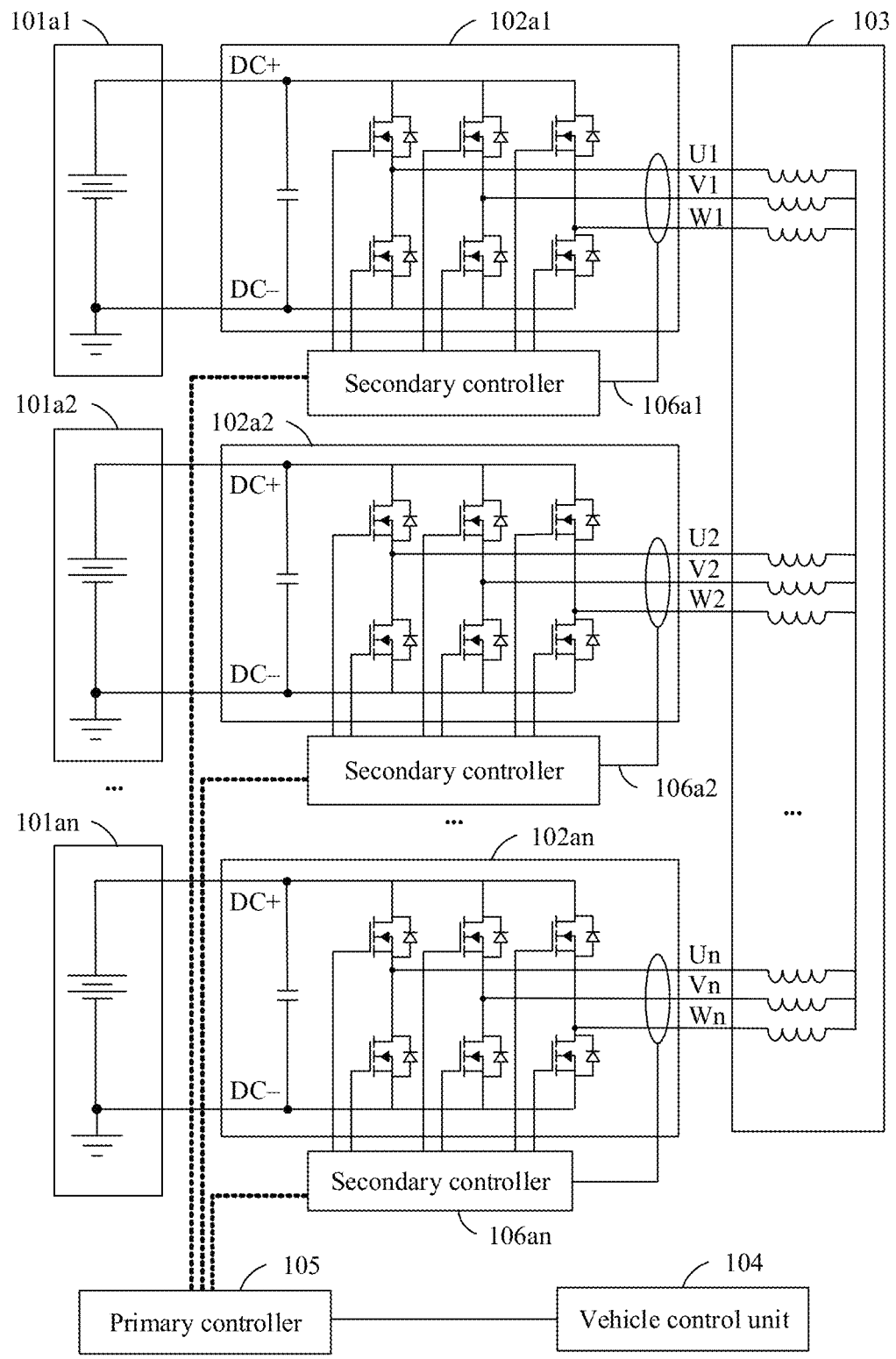
FIG. 6 is a schematic diagram of still another motor drive system according to an embodiment of this application.

Refer to FIG. 6. FIG. 6 is a schematic diagram of still another motor drive system according to an embodiment of this application.

A motor of the drive system uses a three-phase winding, and further includes a vehicle control unit 104, a primary controller 105, and secondary controllers 106a1 to 106an.

Each DC-AC circuit corresponds to one secondary controller. In other words, a quantity of the secondary controllers is the same as a quantity of the DC-AC circuits. The secondary controller can control a working status of a correspondingly connected DC-AC circuit. In actual application, the secondary controller may control the working status of the DC-AC circuit by sending a drive signal to each controllable switching transistor in the correspondingly connected DC-AC circuit. The drive signal may be a PWM (pulse-width modulation) signal.

Working data of batteries in a power battery pack may be collected by using a temperature sensor, a voltage sensor, a current sensor, and the like. Whether a battery is faulty may be determined based on the sampled working data.

In some embodiments, the vehicle control unit 104 may determine a faulty battery module based on the sampled working data. In some embodiments, another component having a data processing function on an electric vehicle may determine a faulty battery module based on the sampled working data, and notify the vehicle control unit 104 of a corresponding result. This is not limited in this embodiment of this application.

When determining that some battery modules are faulty, the vehicle control unit 104 sends a disable instruction to a secondary controller corresponding to the faulty battery module by using the primary controller 105, so that the secondary controller receiving the disable instruction controls a corresponding DC-AC circuit to stop working, implementing fault isolation.

In addition, the vehicle control unit 104 may further report a fault status to a driver, for example, by displaying the fault status on a display of the vehicle or giving a voice notification.

A DC-AC circuit corresponding to another battery module that works normally may continue to work or be disabled based on a control logic of the vehicle control unit 104 or an instruction delivered by the vehicle driver.

In actual application, the vehicle control unit 104 may further determine fault severity and correspondingly execute different control logics.

For example, when determining that a battery module has a critical fault, for example, a risk of fire or explosion, the vehicle control unit 104 may send a disable instruction to all secondary controllers by using the primary controller 105, so that all DC-AC circuits stop working, and the driver may further be prompted to leave the vehicle.

For another example, when determining that a battery module has a minor fault, for example, low battery or poor contact of the battery, the vehicle control unit 104 sends a disable instruction to a secondary controller corresponding to the faulty battery module by using the primary controller 105, so that the secondary controller controls a corresponding DC-AC circuit to stop working, and another battery module that works normally may continue to supply power to a corresponding motor winding. In this way, the vehicle can continue to travel.

The following provides descriptions with reference to the accompanying drawings.

Figure 7:
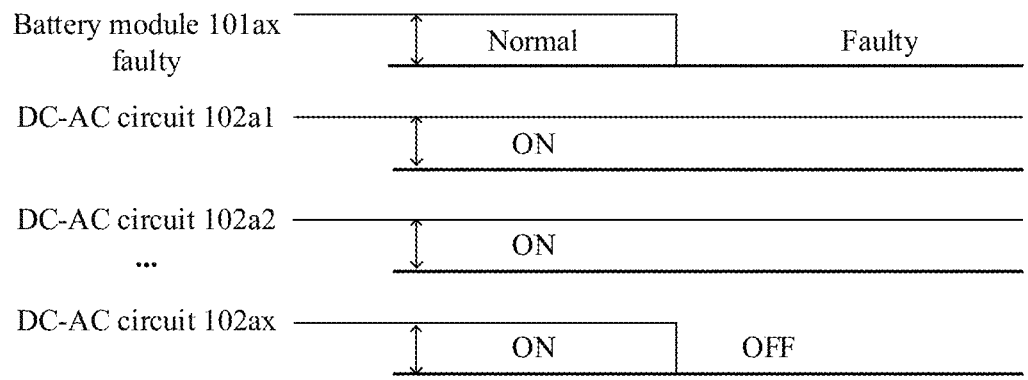
FIG. 7 is a diagram of a control sequence of DC-AC circuits according to an embodiment of this application.

Refer to FIG. 7. FIG. 7 is a diagram of a control sequence of DC-AC circuits according to an embodiment of this application.

In an example in which the vehicle control unit 104 determines that a battery module 101ax is faulty (x may be any value from 1 to n) and the fault is a minor fault, the vehicle control unit 104 sends a disable instruction to a secondary controller corresponding to the faulty battery module 101ax by using the primary controller, so that the secondary controller controls the corresponding DC-AC circuit 102ax to stop working, and other DC-AC circuits such as 102a1 and 102a2 may continue to work normally. In this way, the electric vehicle can continue to travel.

The vehicle control unit 104 may further determine a quantity of working DC-AC circuits based on a load of the motor. The following provides descriptions with reference to the accompanying drawings.

Figure 8:
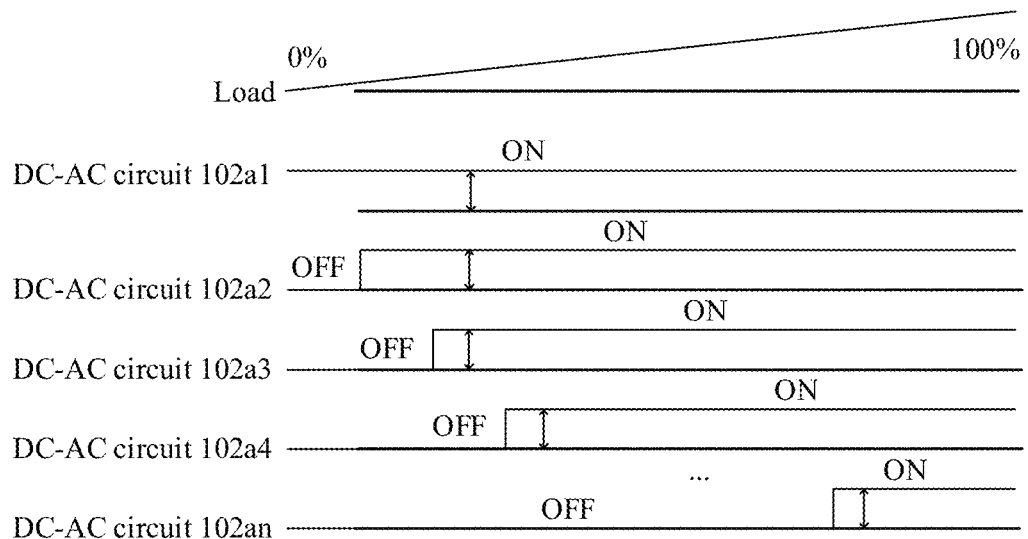
FIG. 8 is a sequence diagram of a correspondence between a load of a motor and a working status of each DC-AC circuit according to an embodiment of this application.

Refer to FIG. 8. FIG. 8 is a sequence diagram of a correspondence between a load of a motor and a working status of each DC-AC circuit according to an embodiment of this application.

The vehicle control unit 104 may obtain a load of the motor, and send a control instruction to the primary controller 105 based on the load.

The primary controller 105 controls a quantity of working DC-AC circuits based on the control instruction, and the quantity of working DC-AC circuits is positively correlated with the load. In other words, as the load increases, more DC-AC circuits are gradually put into operation.

In conclusion, according to the control system provided in this embodiment of this application, when determining that a battery module is faulty, the vehicle control unit can send a disable instruction to a secondary controller corresponding to the faulty battery module by using the primary controller, so that the secondary controller receiving the disable instruction controls a corresponding DC-AC circuit to stop working, to reduce impact caused by the fault and implement fault isolation. In addition, another battery module that supplies power normally can continue to supply power to a corresponding motor winding. In this way, the electric vehicle can continue to travel.

Further, according to the motor drive system provided in this embodiment of this application, the vehicle control unit can further send a control instruction to the primary controller based on a load of the motor, so that the primary controller controls a quantity of working DC-AC circuits based on the control instruction. In other words, a quantity of battery modules that supply power can be selected based on a scenario of the electric vehicle. This reduces energy consumption and prolongs an endurance mileage of a power battery pack.

In addition, when a motor winding is faulty, the control system provided in this embodiment of this application can further perform fault isolation. Details are described below. The fault of the motor winding includes at least one of a winding short-circuit fault and a winding open-circuit fault.

In some embodiments, when it is determined that a motor winding is faulty, the primary controller can control a DC-AC circuit corresponding to the faulty winding to stop working, implementing fault isolation.

In some embodiments, the vehicle control unit may determine a faulty motor winding, and send a disable instruction to a secondary controller corresponding to the faulty winding by using the primary controller, so that the secondary controller receiving the disable instruction controls a corresponding DC-AC circuit to stop working, implementing fault isolation.

In the foregoing embodiment, that the vehicle control unit delivers a control instruction controlling a DC-AC circuit to a secondary controller by using the primary controller is used as an example. The following describes another manner of controlling the DC-AC circuit with reference to the accompanying drawings.

Drive System Embodiment 3

Still refer to the motor drive system shown in FIG. 6. The drive system provided in this embodiment of this application also includes a vehicle control unit 104, a primary controller 105, and secondary controllers 106a1 to 106an. A difference lies in that, when it is determined that a battery module is faulty, the primary controller 105 in this embodiment of this application is configured to: send a disable instruction to a secondary controller corresponding to the faulty battery module, so that the secondary controller receiving the disable instruction controls a corresponding DC-AC circuit to stop working; and send fault information of the faulty battery module to the vehicle control unit 104. The vehicle control unit 104 is configured to notify a driver of the fault information, for example, by displaying the fault information on a display of a vehicle or giving a voice notification. Details are described below.

Working data of batteries in a power battery pack may be collected by using a temperature sensor, a voltage sensor, a current sensor, and the like. Whether a battery is faulty may be determined based on the sampled working data.

In some embodiments, the primary controller 105 may determine a faulty battery module based on the sampled working data. In some embodiments, another component having a data processing function on an electric vehicle may determine a faulty battery module based on the sampled working data, and notify the primary controller 105 of a corresponding result. This is not limited in this embodiment of this application.

When determining that a battery module is faulty, the primary controller 105 sends a disable instruction to a secondary controller corresponding to the faulty battery module, so that the secondary controller receiving the disable instruction controls a corresponding DC-AC circuit to stop working, implementing fault isolation. The primary controller 105 may further feedback the fault information to the vehicle control unit 105.

A DC-AC circuit corresponding to another battery module that works normally may continue to work or be disabled based on a control logic of the primary controller 105 or an instruction delivered by the vehicle driver.

For example, when determining that a battery module has a critical fault, for example, a potential risk of fire or explosion, the primary controller 105 may send a disable instruction to all secondary controllers, so that the secondary controllers control all DC-AC circuits to stop working. In addition, fault information may further be sent to the vehicle control unit 105, to prompt the driver to leave the vehicle.

For another example, when determining that a battery module has a minor fault, for example, low battery or poor contact of the battery, the primary controller 105 sends a disable instruction only to a secondary controller corresponding to the faulty battery module, to control only a DC-AC circuit corresponding to the faulty battery module to stop working, and a DC-AC circuit corresponding to another battery module that works normally may normally work. In this way, the vehicle can continue to travel.

Still refer to the diagram of the control sequence shown in FIG. 7. In an example in which the primary controller 105 determines that a battery module 101ax (x may be any value from 1 to n) is faulty and the fault is a minor fault, the primary controller sends a disable instruction to a secondary controller 106ax, so that the secondary controller 106ax controls, based on the disable instruction, a DC-AC circuit 102ax to stop working, and another DC-AC circuit can continue to work normally. In this way, the electric vehicle can continue to travel.

Still refer to the sequence diagram shown in FIG. 8. The vehicle control unit 104 may further determine a working status of each DC-AC circuit based on a load of the motor. The vehicle control unit 104 may obtain a load of the motor, and send a control instruction to the primary controller 105 based on the load. In this case, the control instruction may further include an ID of each DC-AC circuit that needs to be put into operation.

The primary controller 105 may control, by using the secondary controller, a quantity of working DC-AC circuits based on the control instruction, and the quantity of working DC-AC circuits is positively correlated with the load. In other words, as the load increases, more DC-AC circuits are gradually put into operation.

In conclusion, according to the control system provided in this embodiment of this application, when determining that a battery module is faulty, the primary controller sends a disable signal to a secondary controller corresponding to the faulty battery module, so that the secondary controller controls a corresponding DC-AC circuit to stop working, to reduce impact caused by the fault and implement fault isolation. A DC-AC circuit corresponding to another battery module that works normally may normally work. In this way, the vehicle can continue to travel, facilitating vehicle rescue. Therefore, redundancy of the drive system is further improved.

Further, according to the motor drive system provided in this embodiment of this application, the vehicle control unit can further send a control instruction to the primary controller based on a load of the motor, so that the primary controller controls, by using the secondary controller, a quantity of working DC-AC circuits based on the control instruction. In other words, a quantity of battery modules that supply power can be selected based on a scenario of the electric vehicle. This reduces energy consumption and prolongs an endurance mileage of a power battery pack.

In addition, when a motor winding is faulty, the control system provided in this embodiment of this application can further perform fault isolation. Details are described below.

In some embodiments, when determining that a motor winding is faulty, the primary controller in this embodiment of this application can further send a disable instruction to a secondary controller corresponding to the faulty winding, so that the secondary controller controls a corresponding DC-AC circuit to stop working, implementing fault isolation.

In some embodiments, the vehicle control unit may determine a faulty motor winding, and send a disable instruction to a secondary controller corresponding to the faulty winding by using the primary controller, so that the secondary controller controls a corresponding DC-AC circuit to stop working, implementing fault isolation.

The foregoing embodiment is described by using an example in which a drive system includes a vehicle control unit, a primary controller, and a secondary controller. The following describes another manner of controlling a DC-AC circuit with reference to the accompanying drawings.

Drive System Embodiment 4

Figure 9:
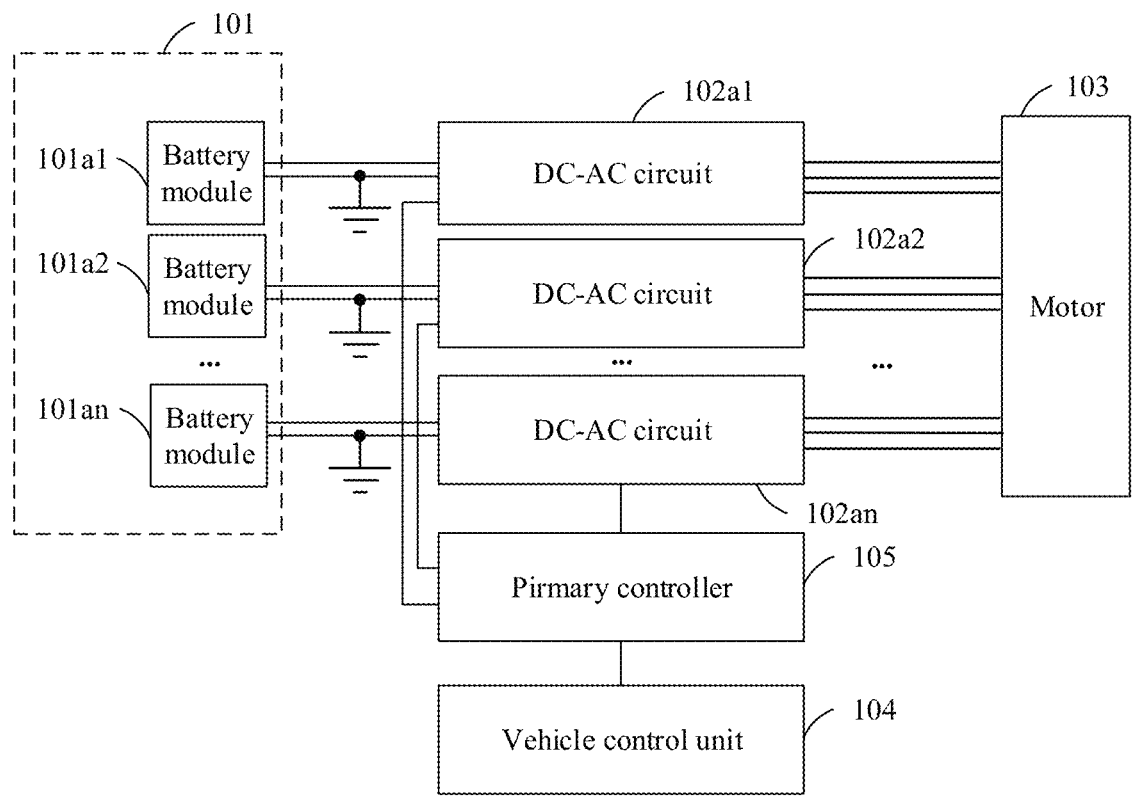
FIG. 9 is a schematic diagram of yet another motor drive system according to an embodiment of this application.

Refer to FIG. 9. FIG. 9 is a schematic diagram of yet another motor drive system according to an embodiment of this application.

The drive system corresponds to FIG. 2. A motor uses a three-phase winding, and the drive system further includes a vehicle control unit 104 and a primary controller 105.

The primary controller 105 is separately connected to each DC-AC circuit, and can control a working status of each DC-AC circuit.

Working data of batteries in a power battery pack may be collected by using a temperature sensor, a voltage sensor, a current sensor, and the like. Whether a battery is faulty may be determined based on the sampled working data.

In some embodiments, the vehicle control unit 104 may determine a faulty battery module based on the sampled working data. In some embodiments, another component having a data processing function on an electric vehicle may determine a faulty battery module based on the sampled working data, and notify the vehicle control unit 104 of a corresponding result. This is not limited in this embodiment of this application.

The battery module is numbered in advance, ID of the battery module is obtained, and a correspondence between the battery module and the ID is stored in the vehicle control unit 104.

When determining that a battery module is faulty, the vehicle control unit 104 can send a disable instruction to the primary controller 105. The disable instruction carries an ID of the faulty battery module, and can indicate a DC-AC circuit that needs to be disabled.

When receiving the disable instruction, the primary controller 105 controls, based on the ID of the faulty battery module, a DC-AC circuit corresponding to the faulty battery module to stop working, implementing fault isolation. In addition, the vehicle control unit 104 may further notify a driver of a fault status, for example, by displaying the fault status on a display of the vehicle or giving a voice notification.

A DC-AC circuit corresponding to another battery module that works normally may continue to work or be disabled based on a control logic of the vehicle control unit 104 or an instruction delivered by the vehicle driver.

In actual application, the vehicle control unit 104 may further determine fault severity and correspondingly execute different control logics.

For example, when determining that a battery module has a critical fault, for example, a risk of fire or explosion, the vehicle control unit 104 may send, to the primary controller 105, a disable instruction carrying IDs of all battery modules, so that the primary controller 105 controls all DC-AC circuits to stop working, and the driver may further be prompted to leave the vehicle.

For another example, when determining that a battery module has a minor fault, for example, low battery or poor contact of the battery, the vehicle control unit 104 may control only a DC-AC circuit corresponding to the faulty battery module to stop working, and another battery module that works normally may continue to supply power to a corresponding motor winding. In this way, the vehicle can continue to travel to a maintenance point.

The following provides descriptions with reference to the accompanying drawing.

Still refer to the diagram of the control sequence shown in FIG. 7. In an example in which the vehicle control unit 104 determines that a battery module 101ax (x may be any value from 1 to n) is faulty and the fault is a minor fault, the vehicle control unit sends, to the primary controller, a disable instruction carrying an ID of the battery module 101ax, so that the primary controller controls a DC-AC circuit 102ax to stop working, and other DC-AC circuits such as 102a1 and 102a2 may continue to work normally. In this way, the electric vehicle can continue to travel.

Still refer to the sequence diagram shown in FIG. 8. The vehicle control unit may further determine a working status of each DC-AC circuit based on a load of the motor.

The vehicle control unit 104 may obtain a load of the motor, and send a control instruction to the primary controller 105 based on the load. In this case, the control instruction further includes an ID of each DC-AC circuit that needs to be put into operation.

The primary controller 105 controls a quantity of working DC-AC circuits based on the control instruction, and the quantity of working DC-AC circuits is positively correlated with the load. In other words, as the load increases, more DC-AC circuits are gradually put into operation.

In conclusion, according to the control system provided in this embodiment of this application, when determining that a battery module is faulty, the vehicle control unit can send, to the primary controller, a disable instruction carrying an ID of the faulty battery module, so that the primary controller controls, based on the disable instruction, a corresponding DC-AC circuit to stop working, to reduce impact caused by the fault and implement fault isolation. A DC-AC circuit corresponding to another battery module that works normally may normally work. In this way, the vehicle can continue to travel, facilitating vehicle rescue. Therefore, redundancy of the drive system is further improved. In addition, a circuit structure is simplified and costs are reduced because no secondary controller is needed.

Further, according to the motor drive system provided in this embodiment of this application, the vehicle control unit can further send a control instruction to the primary controller based on a load of the motor, so that the primary controller controls a quantity of working DC-AC circuits based on the control instruction. In other words, a quantity of battery modules that supply power can be selected based on a scenario of the electric vehicle. This reduces energy consumption and prolongs an endurance mileage of a power battery pack.

In addition, when a motor winding is faulty, the control system provided in this embodiment of this application can further perform fault isolation. Details are described below.

In some embodiments, when it is determined that a motor winding is faulty, the primary controller can control a DC-AC circuit corresponding to the faulty winding to stop working, implementing fault isolation.

In some embodiments, the vehicle control unit may determine a faulty motor winding, and send a disable instruction to the primary controller, so that the primary controller controls a corresponding DC-AC circuit to stop working, implementing fault isolation.

The foregoing embodiment is described by using an example in which a vehicle control unit sends, to a primary controller, a disable instruction carrying an ID of a faulty battery module, and then the primary controller controls a working status of a DC-AC circuit based on the disable instruction. The following describes still another manner of controlling a DC-AC circuit with reference to the accompanying drawings.

Drive System Embodiment 5

Still refer to the schematic diagram of the motor drive system shown in FIG. 9.

As described in Embodiment 4, the motor drive system provided in this embodiment of this application also includes a vehicle control unit 104 and a primary controller 105.

However, a difference lies in that, when it is determined that a battery module is faulty, the primary controller 105 in this embodiment of this application is configured to control a DC-AC circuit corresponding to the faulty battery module to stop working, and send fault information of the faulty battery module to the vehicle control unit 104. The vehicle control unit 105 is configured to notify a driver of the fault information, for example, by displaying the fault information on a display of a vehicle or giving a voice notification. Details are described below.

Working data of batteries in a power battery pack may be collected by using a temperature sensor, a voltage sensor, a current sensor, and the like. Whether a battery is faulty may be determined based on the sampled working data.

In some embodiments, the primary controller 105 may determine a faulty battery module based on the sampled working data. In some embodiments, another component having a data processing function on an electric vehicle may determine a faulty battery module based on the sampled working data, and notify the primary controller 105 of a corresponding result. This is not limited in this embodiment of this application.

When determining that a battery module is faulty, the primary controller 105 controls a DC-AC circuit corresponding to the faulty battery module to stop working, implementing fault isolation. In addition, fault information is fed back to the vehicle control unit 105.

A DC-AC circuit corresponding to another battery module that works normally may continue to work or be disabled based on a control logic of the primary controller 105 or an instruction delivered by the vehicle driver.

In actual application, the primary controller 105 may further determine fault severity and correspondingly execute different control logics.

For example, when determining that a battery module has a critical fault, for example, a potential risk of fire or explosion, the primary controller 105 may control all DC-AC circuits to stop working, and may further send fault information to the vehicle control unit 105, to prompt the driver to leave the vehicle.

For another example, when determining that a battery module has a minor fault, for example, low battery or poor contact of the battery, the primary controller 105 may control only a DC-AC circuit corresponding to the faulty battery module to stop working, and another battery module that works normally may continue to supply power to a corresponding motor winding. In this way, the vehicle can continue to travel.

The following provides descriptions with reference to the accompanying drawing.

Still refer to the diagram of the control sequence shown in FIG. 7. In an example in which the primary controller 105 determines that a battery module 101*ax* (x may be any value from 1 to n) is faulty and the fault is a minor fault, the primary controller controls a DC-AC circuit 102*ax* to stop working, and other DC-AC circuits such as 102*a*1 and 102*a*2 may continue to work normally. Another battery module that works normally may continue to supply power to a corresponding motor winding. In this way, the vehicle can continue to travel.

Still refer to the sequence diagram shown in FIG. 8. The vehicle control unit 104 may further determine a working status of each DC-AC circuit based on a load of the motor.

The vehicle control unit 104 may obtain a load of the motor, and send a control instruction to the primary controller 105 based on the load. In this case, the control instruction may further include an ID of each DC-AC circuit that needs to be put into operation.

The primary controller 105 controls a quantity of working DC-AC circuits based on the control instruction, and the quantity of working DC-AC circuits is positively correlated with the load. In other words, as the load increases, more DC-AC circuits are gradually put into operation.

In conclusion, according to the control system provided in this embodiment of this application, when determining that a battery module is faulty, the primary controller can control a corresponding DC-AC circuit to stop working, to reduce impact caused by the fault and implement fault isolation. In addition, a DC-AC circuit corresponding to a battery module that works normally can be controlled to continue working, so that another battery module that works normally can continue to supply power to a corresponding motor winding, facilitating vehicle rescue. Therefore, redundancy of the drive system is further improved. In addition, a circuit structure is simplified and costs are reduced because no secondary controller is needed.

Further, according to the motor drive system provided in this embodiment of this application, the vehicle control unit can further send a control instruction to the primary controller based on a load of the motor, so that the primary controller controls a quantity of working DC-AC circuits based on the control instruction. In other words, a quantity of battery modules that supply power can be selected based on a scenario of the electric vehicle. This reduces energy consumption and prolongs an endurance mileage of a power battery pack.

In addition, when a motor winding is faulty, the control system provided in this embodiment of this application can further perform fault isolation. Details are described below.

In some embodiments, when it is determined that a motor winding is faulty, the primary controller in this embodiment of this application can control a DC-AC circuit corresponding to the faulty winding to stop working, implementing fault isolation.

In some embodiments, the vehicle control unit may determine a faulty motor winding, and notify the primary controller, so that the primary controller controls a corresponding DC-AC circuit to stop working, implementing fault isolation.

The foregoing drive systems provided in drive system embodiment 2 to embodiment 5 are described by using an example in which the motor winding is a three-phase winding. It may be understood that when the motor winding is a two-phase winding, the control manners provided in Embodiment 2 to Embodiment 5 are also applicable. Details are not described again in embodiments of this application.

In addition, a negative electrode of each battery module may or may not be connected to a common reference ground. This is not limited in embodiments of this application.

Further, an example in which the DC-AC circuit is a two-level three-phase half-bridge circuit is used in the foregoing embodiments. In actual application, the DC-AC circuit may also be a two-level three-phase full-bridge circuit, a multi-level circuit, or another circuit that can implement direct current-alternating current conversion. The following uses an example in which the DC-AC circuit is a two-level three-phase full-bridge circuit for description.

Figure 10:
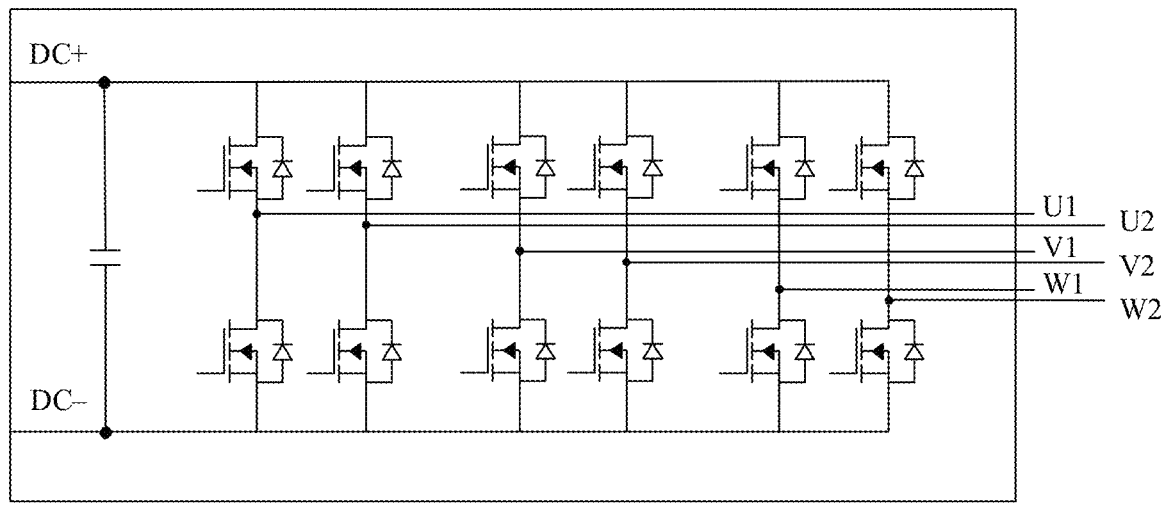
FIG. 10 is a schematic diagram of a two-level three-phase full-bridge circuit according to an embodiment of this application.

Refer to FIG. 10. FIG. 10 is a schematic diagram of a two-level three-phase full-bridge circuit according to an embodiment of this application.

U1 and U2 are outputs of a first group of full-bridge inverters, V1 and V2 are outputs of a second group of full-bridge inverters, and W1 and W2 are outputs of a third group of full-bridge inverters.

The following uses an example in which a motor uses a three-phase winding, a DC-AC circuit uses a two-level three-phase half-bridge circuit, and a negative electrode of each battery module is connected to a common reference ground to describe a working principle of charging the battery module by using the drive system provided in this application.

Drive System Embodiment 6

Figure 11:
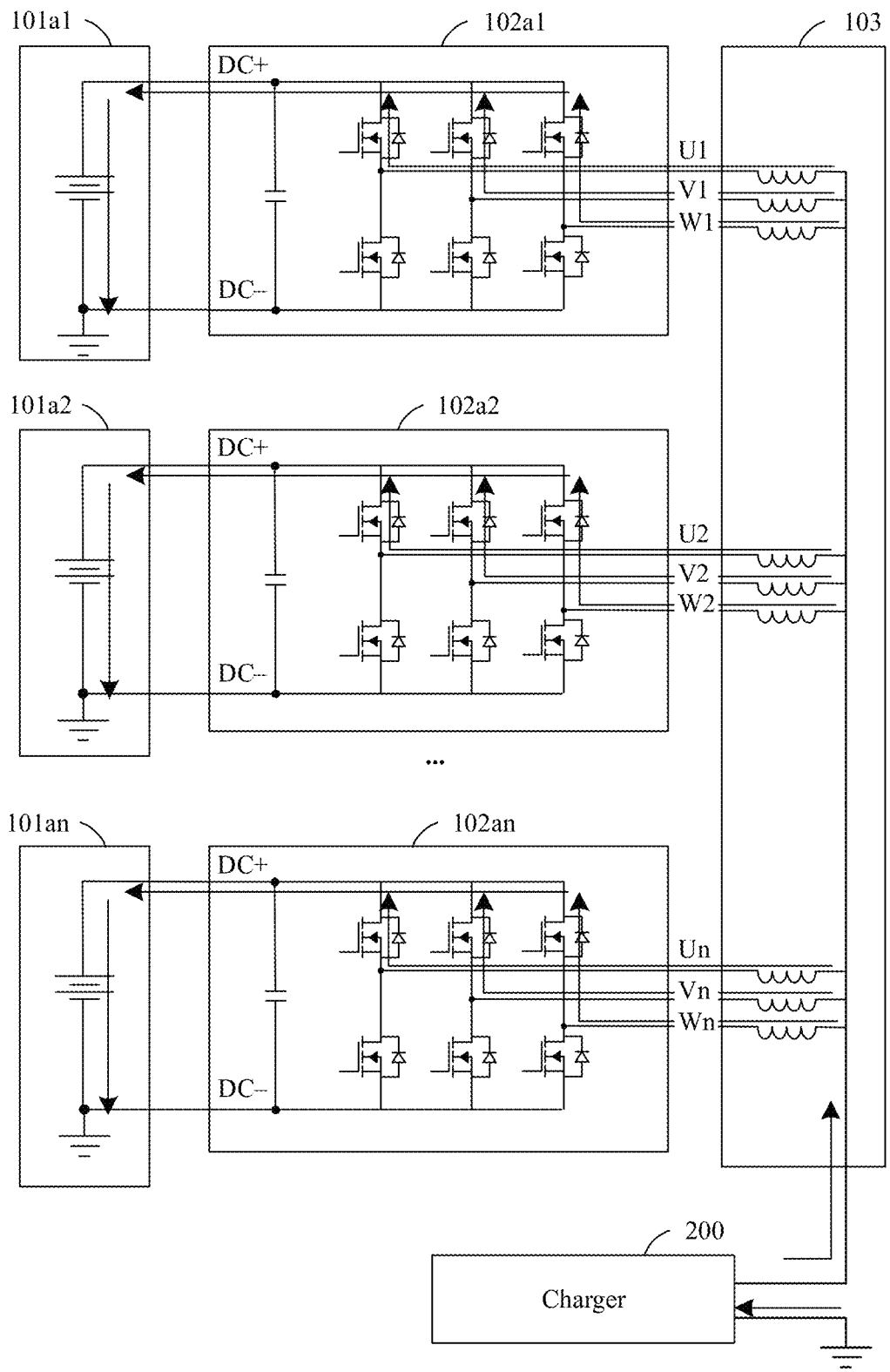
FIG. 11 is a schematic diagram of charging of a drive system according to an embodiment of this application.

Refer to FIG. 11. FIG. 11 is a schematic diagram of charging of a drive system according to an embodiment of this application.

For descriptions of the drive system, refer to the foregoing embodiments. Details are not described herein again in this embodiment of this application. It should be noted that negative electrodes of battery modules in the drive system provided in this embodiment of this application are connected to a common reference ground.

When a power battery pack is being charged, an external charger 200 may be connected. One end of the charger 200 is connected to a common tap of windings of a three-phase motor, and the other end is connected to the common reference ground of the battery modules of the drive system.

The charger 200 may output a direct-current voltage, or may output an alternating-current voltage. The following provides separate descriptions.

When the charger 200 outputs a direct current, a current flow direction in a charging process is shown by arrow directions in FIG. 11. The charging current sequentially flows through the motor winding, a DC-AC circuit, and the battery module, and flows back to the charger through the common reference ground.

When the charger 200 outputs an alternating current, a controllable switching transistor in a DC-AC circuit may be controlled to convert a current flowing through the DC-AC circuit into a direct current, and then the direct current is transmitted to a corresponding battery module. In this case, the DC-AC circuit is configured to implement alternating current-direct current conversion, and is equivalent to an inverter.

For the foregoing two cases, a working status of the switching transistor of the DC-AC circuit needs to be controlled. The following describes various embodiments.

Embodiment 1: The drive system includes a vehicle control unit, a primary controller, and a secondary controller.

When determining that the drive system is charging the battery modules, the vehicle control unit determines, based on a type of an output current (a direct current or an alternating current) of a charging pile and working statuses of the battery modules and the windings (whether a fault occurs), a control instruction corresponding to each DC-AC circuit.

The vehicle control unit sends the control instruction to each corresponding secondary controller by using the primary controller, so that each secondary controller controls a working status of a controllable switching transistor in a corresponding DC-AC circuit based on the control instruction, to charge batteries in the battery modules.

Embodiment 2: The drive system includes a vehicle control unit, a primary controller, and a secondary controller.

When determining that the drive system is charging the battery modules, the primary controller determines, based on a type of an output current (a direct current or an alternating current) of a charging pile and working statuses of the battery modules and the windings (whether a fault occurs), a control instruction corresponding to each DC-AC circuit.

The primary controller sends the control instruction to each corresponding secondary controller, so that each secondary controller controls a working status of a controllable switching transistor in a corresponding DC-AC circuit based on the control instruction, to charge batteries in the battery modules.

The primary controller can further feedback charging information to the vehicle control unit, so that the vehicle control unit displays the charging information on a display. The charging information is not limited in this embodiment of this application. For example, the charging information may include an ID of a battery module that is being charged.

Embodiment 3: The drive system includes a vehicle control unit and a primary controller.

When determining that the drive system is charging the battery modules, the vehicle control unit determines, based on a type of an output current (a direct current or an alternating current) of a charging pile and working statuses of the battery modules and the windings (whether a fault occurs), a control instruction corresponding to each DC-AC circuit.

The vehicle control unit sends the control instruction to the primary controller, so that the primary controller controls a working status of a controllable switching transistor in a corresponding DC-AC circuit based on the control instruction, to charge batteries in the battery modules.

Embodiment 4: The drive system includes a vehicle control unit and a primary controller.

When determining that the drive system is charging the battery modules, the primary controller controls, based on a type of an output current (a direct current or an alternating current) of a charging pile and working statuses of the battery modules and the windings (whether a fault occurs), a working status of a controllable switching transistor in each DC-AC circuit, to charge batteries in the battery modules.

The primary controller can further feedback charging information to the vehicle control unit, so that the vehicle control unit displays the charging information on a display.

In conclusion, when the battery modules are being charged by using the drive system provided in this application, the battery modules are independent of each other, and the charger can separately charge the battery modules. For a faulty battery module, charging of the faulty battery module may be stopped, and another normal battery module can still be normally charged without being affected. Therefore, redundancy of the drive system is improved.

Power System Embodiment

Based on the motor drive systems provided in the foregoing embodiments, an embodiment of this application further provides a power system. The power system may be used in an electric vehicle. The following provides descriptions with reference to the accompanying drawing.

Figure 12:
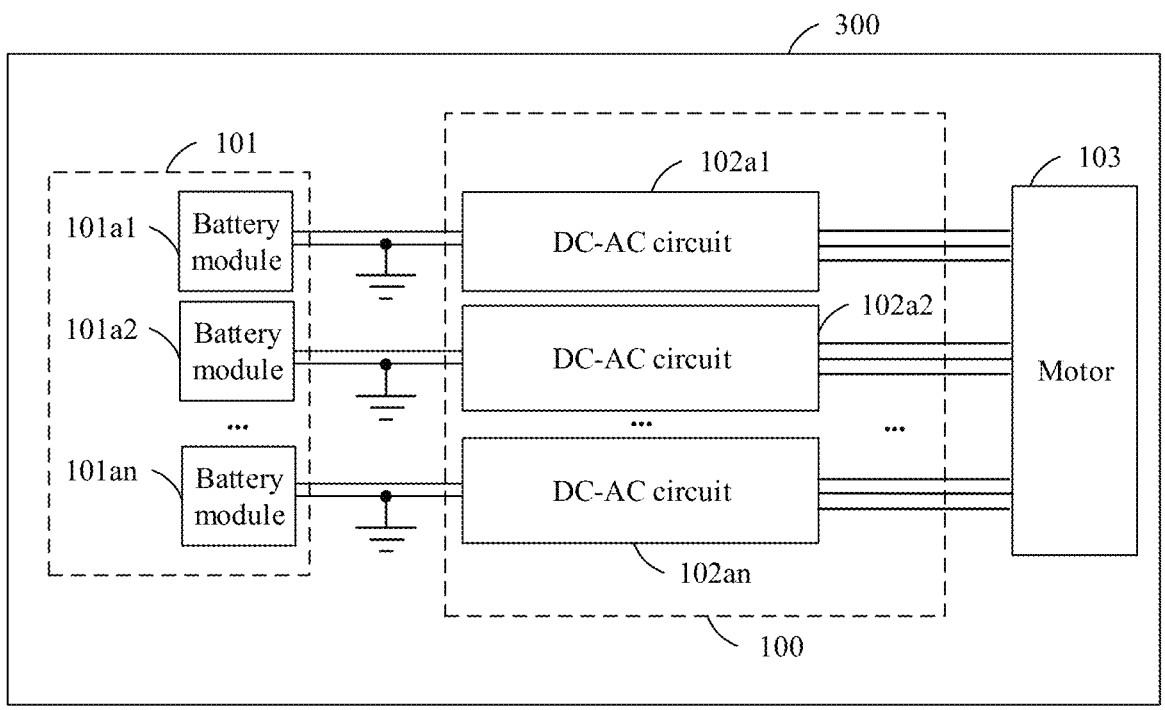
FIG. 12 is a schematic diagram of a power system according to an embodiment of this application.

Refer to FIG. 12. FIG. 12 is a schematic diagram of a power system according to an embodiment of this application.

A power system 300 includes a power battery pack 101, a drive system 100, and a motor 103.

The drive system 100 is configured to drive windings of the motor 103.

The power battery pack 101 includes at least two battery modules that are independent of each other. The battery modules one-to-one correspond to DC-AC circuits. That is, as shown in the figure, each battery module corresponds to one DC-AC circuit, and each DC-AC circuit corresponds to one winding of the motor. A quantity of the battery modules is the same as a quantity of the DC-AC circuits.

Output voltages of the battery modules may be equal or not equal. In other words, quantities of batteries included in the battery modules may be equal or not equal. This is not limited in this embodiment of this application.

The drive system 100 includes DC-AC circuits 102a1 to 102an.

The DC-AC circuit is configured to convert a direct current provided by the corresponding battery module into an alternating current to drive a winding of the motor.

For descriptions of the drive system 100, refer to the foregoing drive system embodiments. Details are not described herein again in this embodiment of this application.

The motor 103 is configured to supply power to a load. The motor includes N windings, and a quantity of phases of each of the N windings may be 2 or 3. That is, the motor may include N two-phase windings or N three-phase windings. This is not limited in this embodiment of this application. N is an integer greater than or equal to 2.

Each winding of the motor 103 is correspondingly connected to an output end of one DC-AC circuit.

When the quantity of phases of each winding of the motor 103 is 2, that is, when the windings of the motor 103 are two-phase windings, the DC-AC circuit may be a full-bridge circuit, and two ends of each phase in each winding are respectively connected to two output ends of each phase in a corresponding DC-AC circuit.

When the quantity of phases of each winding of the motor 103 is 3, that is, when the windings are three-phase windings, the DC-AC circuit may be a two-level three-phase half-bridge circuit, a two-level three-phase full-bridge circuit, or a multi-level circuit. A first end of each phase in each winding is correspondingly connected to an output end of each phase in one DC-AC circuit, and a second end of each phase in each winding is connected together.

In some embodiments, when a quantity of the windings of the motor 103 is N times of 3, the windings of the motor may be six-phase windings, nine-phase windings, twelve-phase windings, fifteen-phase windings, or the like. This is not limited in this embodiment of this application.

A negative electrode of each battery module may or may not be connected to a common reference ground. This is not limited in embodiments of this application.

In conclusion, the power battery pack corresponding to the drive system of the power system includes at least two battery modules that are independent of each other. The drive system includes at least two DC-AC circuits, and the battery modules one-to-one correspond to the DC-AC circuits. In other words, a quantity of the battery modules is the same as a quantity of the DC-AC circuits. Each battery module is correspondingly connected to an input end of one DC-AC circuit, and an output end of each DC-AC circuit is correspondingly connected to one winding of the motor, that is, the DC-AC circuits one-to-one correspond to each winding of the motor. A quantity of phases of each winding of the motor may be 2 or 3. The DC-AC circuit can convert a direct current provided by the corresponding battery module into an alternating current to drive a winding of the motor. In the solutions of this application, the power battery pack is divided into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding.

The drive system can further control a quantity of working DC-AC circuits based on a load of the motor. That is, a quantity of battery modules that supply power can be selected based on a scenario in which an electric vehicle is located. This reduces energy consumption and prolongs an endurance mileage of the power battery pack.

It may be understood that the power system provided in this embodiment of this application may be further used in another scenario in which a motor winding is driven by using a battery pack. This is not limited in this embodiment of this application.

Method Embodiment

Based on the motor drive system provided in the foregoing embodiments, an embodiment of this application further provides a motor drive method. The following provides descriptions.

Figure 13:
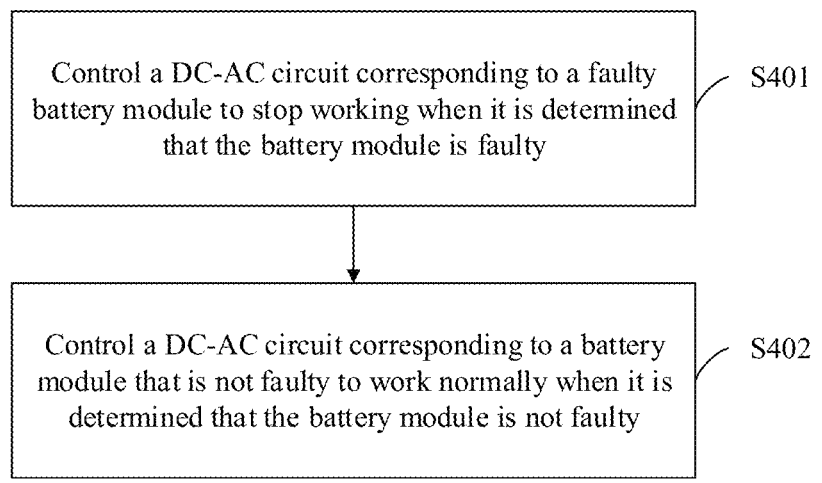
FIG. 13 is a flowchart of a motor drive method according to an embodiment of this application.

Refer to FIG. 13. FIG. 13 is a flowchart of a motor drive method according to an embodiment of this application.

The method is used to drive a motor that uses a power battery pack as a power supply. The power battery pack includes at least two battery modules. The battery modules one-to-one correspond to DC-AC circuits. Each battery module corresponds to one DC-AC circuit, and each DC-AC circuit corresponds to one winding of the motor. A quantity of the battery modules is the same as a quantity of the DC-AC circuits. The windings of the motor may be two-phase windings or three-phase windings.

For descriptions of a motor drive system, refer to the foregoing embodiments. Details are not described herein again in this embodiment of this application.

The method is used to control a DC-AC circuit to convert a direct current provided by a corresponding battery module into an alternating current to drive a winding of the motor, and includes the following operations.

S401: Control a DC-AC circuit corresponding to a faulty battery module to stop working when it is determined that the battery module is faulty.

S402: Control a DC-AC circuit corresponding to a battery module that is not faulty to work normally when it is determined that the battery module is not faulty.

Because a device having a control function in the drive system may have different embodiments, the foregoing drive method also has different embodiments correspondingly. The following separately provides descriptions.

Embodiment 1: The drive system includes a vehicle control unit, a primary controller, and a secondary controller.

When determining a battery module is faulty, the vehicle control unit sends a disable instruction to a secondary controller corresponding to the faulty battery module by using the primary controller, so that the secondary controller receiving the disable instruction controls a corresponding DC-AC circuit to stop working. The DC-AC circuit stops driving a winding of the motor, implementing fault isolation. In addition, the vehicle control unit may further report a fault status to a driver, for example, by displaying the fault status on a display of the vehicle or giving a voice notification.

A DC-AC circuit corresponding to another battery module that works normally may continue to work or be disabled based on a control logic of the vehicle control unit or an instruction delivered by the vehicle driver.

Embodiment 2: The drive system includes a vehicle control unit, a primary controller, and a secondary controller.

When determining that a battery module is faulty, the primary controller sends a disable instruction to a secondary controller corresponding to the faulty battery module, so that the secondary controller receiving the disable instruction controls a corresponding DC-AC circuit to stop working, implementing fault isolation. In addition, fault information is fed back to the vehicle control unit.

A DC-AC circuit corresponding to another battery module that works normally may continue to work or be disabled based on a control logic of the primary controller or an instruction delivered by the vehicle driver.

Embodiment 3: The drive system includes a vehicle control unit and a primary controller.

When receiving a disable instruction, the primary controller controls, based on an ID of a faulty battery module, a DC-AC circuit corresponding to the faulty battery module to stop working, implementing fault isolation. In addition, the vehicle control unit may further notify the driver of a fault status.

A DC-AC circuit corresponding to another battery module that works normally may continue to work or be disabled based on a control logic of the vehicle control unit or an instruction delivered by the vehicle driver.

Embodiment 4: The drive system includes a vehicle control unit and a primary controller.

When determining that a battery module is faulty, the primary controller controls a DC-AC circuit corresponding to the faulty battery module to stop working, implementing fault isolation. In addition, fault information is fed back to the vehicle control unit.

A DC-AC circuit corresponding to another battery module that works normally may continue to work or be disabled based on a control logic of the primary controller or an instruction delivered by the vehicle driver.

The vehicle control unit is further configured to obtain a load of the motor, and send a control instruction to the primary controller based on the load.

The primary controller is further configured to control a quantity of working DC-AC circuits based on the control instruction, and the quantity of working DC-AC circuits is positively correlated with the load. In other words, as the load increases, more DC-AC circuits are gradually put into operation.

When it is determined that a motor winding is faulty, the primary controller is further configured to control a DC-AC circuit corresponding to the faulty winding to stop working, implementing fault isolation.

In conclusion, according to the method provided in this embodiment of this application, when it is determined that a battery module is faulty, a DC-AC circuit corresponding to the faulty battery module stops working, to reduce impact caused by the fault and implement fault isolation. In addition, a DC-AC circuit corresponding to a battery module that works normally can be controlled to continue working, so that the battery module that works normally can continue to supply power to an electric vehicle. In this way, the vehicle can continue to travel, facilitating vehicle rescue. Therefore, redundancy of the drive system is further improved.

Electric Vehicle Embodiment

Based on the power system provided in the foregoing embodiment, an embodiment of this application further provides an electric vehicle. The following provides descriptions with reference to the accompanying drawing.

Figure 14:
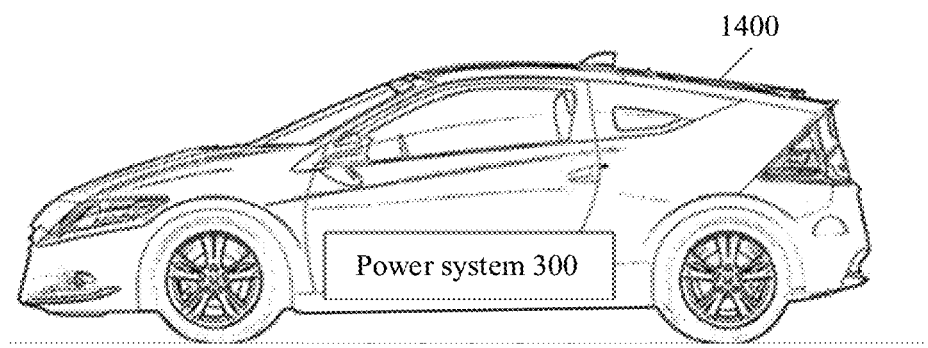
FIG. 14 is a schematic diagram of an electric vehicle according to an embodiment of this application.

Refer to FIG. 14. FIG. 14 is a schematic diagram of an electric vehicle according to an embodiment of this application.

An electric vehicle 1400 provided in this embodiment of this application includes a power system 300. The power system 300 includes a power battery pack, a drive system, and a motor.

The drive system is configured to drive windings of the motor.

The power battery pack includes at least two battery modules that are independent of each other. The battery modules one-to-one correspond to DC-AC circuits. That is, as shown in the figure, each battery module corresponds to one DC-AC circuit, and each DC-AC circuit corresponds to one winding of the motor. A quantity of the battery modules is the same as a quantity of the DC-AC circuits.

Output voltages of the battery modules may be equal or not equal. In other words, quantities of batteries included in the battery modules may be equal or not equal. This is not limited in this embodiment of this application.

The drive system further includes at least two DC-AC circuits.

The DC-AC circuit is configured to convert a direct current provided by the corresponding battery module into an alternating current to drive a winding of the motor.

For descriptions of the drive system, refer to the foregoing drive system embodiments. Details are not described herein again in this embodiment.

The motor is configured to supply power to a load. The motor includes N windings, and a quantity of phases of each of the N windings may be 2 or 3. That is, the motor may include N two-phase windings or N three-phase windings. This is not limited in this embodiment of this application. N is an integer greater than or equal to 2.

Each winding of the motor is correspondingly connected to an output end of one DC-AC circuit.

In conclusion, the electric vehicle provided in this embodiment of this application includes a power system. A power battery pack corresponding to a drive system of the power system includes at least two battery modules that are independent of each other. The drive system includes at least two DC-AC circuits, and the battery modules one-to-one correspond to the DC-AC circuits. In other words, a quantity of the battery modules is the same as a quantity of the DC-AC circuits. Each battery module is correspondingly connected to an input end of one DC-AC circuit, and an output end of each DC-AC circuit is correspondingly connected to one winding of the motor, that is, the DC-AC circuits one-to-one correspond to each winding of the motor. A quantity of phases of each winding of the motor may be 2 or 3. The DC-AC circuit can convert a direct current provided by the corresponding battery module into an alternating current to drive a winding of the motor. In the solutions of this application, the power battery pack is divided into battery modules that are independent of each other, and each battery module supplies power to a winding of the motor by using a DC-AC circuit corresponding to the battery module. Therefore, when a battery module is faulty, normal power supply by another battery module is not affected, and the other battery module that supplies power normally can continue to supply power to a corresponding motor winding.

The drive system can further control a quantity of working DC-AC circuits based on a load of the motor. That is, a quantity of battery modules that supply power can be selected based on a scenario in which an electric vehicle is located. This reduces energy consumption and prolongs an endurance mileage of the power battery pack. A type of the controllable switching transistor described in this application may be any one of the following: a relay, an insulated gate bipolar transistor (IGBT), a metal-oxide-semiconductor field-effect transistor (MOSFET), a SiC MOSFET (carbide field-effect transistor), or the like. This is not limited in embodiments of this application.

It should be understood that in this application, "at least one (item)" refers to one or more and "a plurality of" refers to two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing descriptions are merely example embodiments of this application, and are not intended to limit this application in any form. Although the example embodiments of this application are disclosed above, the embodiments are not intended to limit this application. By using the method and the technical content disclosed above, any person skilled in the art can make a plurality of possible changes and modifications on the technical solutions of this application, or amend the technical solutions thereof to be embodiments with equal effects through equivalent variations without departing from the protection scope of the technical solutions of this application. Therefore, any simple amendment, equivalent variation, and modification made on the above embodiments according to the technical essence of this application without departing from the content of the technical solutions of this application shall fall within the protection scope of the technical solutions of this application.

What is claimed is:

1. A motor drive system, configured to drive a motor that uses a power battery pack as a power supply, wherein the power battery pack comprises at least two battery modules that are independent of each other, the motor drive system comprising a vehicle control unit, a primary controller, at least two secondary controllers, at least two direct current-alternating current (DC-AC) circuits, and the battery modules correspond to the DC-AC circuits;
    each battery module is connected to an input end of one of the DC-AC circuits, and an output end of each DC-AC circuit is connected to a corresponding winding of the motor;
    the DC-AC circuit is configured to convert a direct current provided by the corresponding battery module into an alternating current to drive the corresponding winding of the motor;
    each one of the DC-AC circuits corresponds to one secondary controller; and
    when it is determined that a battery module is faulty, the vehicle control unit is configured to use the primary controller to send a disable instruction to the secondary controller corresponding to the faulty battery module so that the secondary controller receiving the disable instruction controls a corresponding one of the DC-AC circuits to stop working.

2. The drive system according to claim 1, wherein
    the disable instruction carries an ID of the faulty battery module; and
    when receiving the disable instruction, the primary controller is configured to control, based on the ID of the faulty battery module, one of the DC-AC circuits corresponding to the faulty battery module to stop working.

3. The drive system according to claim 1, wherein
    when it is determined that a battery module is faulty, the primary controller is configured to control one of the DC-AC circuits corresponding to the faulty battery module to stop working, and send fault information of the faulty battery module to the vehicle control unit; and
    the vehicle control unit is configured to display the fault information on a display.

4. The drive system according to claim 1, wherein
    when it is determined that a battery module is faulty, the primary controller is configured to: and send fault information of the faulty battery module to the vehicle control unit.

5. The drive system according to claim 1, wherein the vehicle control unit is further configured to obtain a load of the motor, and send a control instruction to the primary controller based on the load; and
    the primary controller is further configured to control a quantity of working DC-AC circuits based on the control instruction, wherein the quantity of working DC-AC circuits is positively correlated with the load.

6. The drive system according to claim 1, wherein when it is determined that a winding of the motor is faulty, the primary controller is further configured to control a DC-AC circuit corresponding to the faulty winding to stop working.

7. The drive system according to claim 1, wherein when a winding of the motor is a three-phase winding, three phases of the three-phase winding are interlaced with each other at phase angles of 120°.

8. The drive system according to claim 7, wherein when a winding of the motor is a three-phase winding, every two adjacent three-phase windings are interlaced at a first preset angle, and a value range of the first preset angle is 0° to 180°.

9. The drive system according to claim 1, wherein the DC-AC circuit is a two-level three-phase half-bridge circuit, a two-level three-phase full-bridge circuit, or a multi-level circuit.

10. The drive system according to claim 9, wherein when the DC-AC circuit is a two-level three-phase half-bridge circuit, a negative electrode of each battery module is connected to a common reference ground.

11. The drive system according to claim 10, further comprising a charger, wherein
    a first end of the charger is connected to a common tap of windings of the motor, and a second end of the charger is connected to the common reference ground.

12. A power system, comprising a motor, a power battery pack, and a motor drive system, wherein the motor drive system is configured to drive the motor that uses the power battery pack as a power supply, the drive system comprises a vehicle control unit, a primary controller, at least two secondary controllers, at least two direct current-alternating current (DC-AC) circuits, and at least two battery modules that correspond to the DC-AC circuits;
    each battery module is connected to an input end of one of the DC-AC circuits, and an output end of each DC-AC circuit is connected to a corresponding winding of the motor;

the DC-AC circuit is configured to convert a direct current provided by the corresponding battery module into an alternating current to drive the corresponding winding of the motor;

each one of the DC-AC circuits corresponds to one secondary controller; and when it is determined that a battery module is faulty, the vehicle control unit is configured to use the primary controller to send a disable instruction to the secondary controller corresponding to the faulty battery module so that the secondary controller receiving the disable instruction controls a corresponding one of the DC-AC circuits to stop working;

wherein the power battery pack comprises at least two battery modules that are independent of each other;

the drive system is configured to drive windings of the motor; and the motor is configured to supply power to a load, wherein the motor comprises N windings, a quantity of phases of each of the N windings is 2 or 3, and N is an integer greater than or equal to 2.

13. The power system according to claim 12, wherein each winding is connected to an output end of one DC-AC circuit.

14. The power system according to claim 13, wherein when the quantity of phases of each winding is 2, two ends of each phase in each winding are respectively connected to two output ends of each phase in a corresponding one of the DC-AC circuits.

15. The power system according to claim 13, wherein when the quantity of phases of each winding is 3, a first end of each phase in each winding is connected to an output end of each phase in one of the DC-AC circuits, and a second end of each phase in each winding is connected together.

16. The power system according to claim 12, wherein a negative electrode of each battery module is connected to a common reference ground.

17. The power system according to claim 12, wherein when a quantity of the windings of the motor is N times of 3, the windings of the motor may be any one of the following: six-phase windings, nine-phase windings, twelve-phase windings, or fifteen-phase windings.

18. An electric vehicle, comprising a power system, wherein the power system comprises a motor, a power battery pack, and a motor drive system, wherein the motor drive system is configured to drive the motor that uses the power battery pack as a power supply, the drive system comprises a vehicle control unit, a primary controller, at least two secondary controllers, at least two direct current-alternating current (DC-AC circuits), and at least two battery modules that correspond to the DC-AC circuits;

each battery module is connected to an input end of one of the DC-AC circuits, and an output end of each of the DC-AC circuits is connected to a corresponding winding of the motor;

at least one of the DC-AC circuits is configured to convert a direct current provided by the corresponding battery module into an alternating current to drive the corresponding winding of the motor;

each one of the DC-AC circuits corresponds to one secondary controller; and when it is determined that a battery module is faulty, the vehicle control unit is configured to use the primary controller to send a disable instruction to the secondary controller corresponding to the faulty battery module so that the secondary controller receiving the disable instruction controls a corresponding one of the DC-AC circuits to stop working;

wherein the power battery pack comprises at least two battery modules that are independent of each other;

the drive system is configured to drive windings of the motor; and the motor is configured to supply power to a load, wherein the motor comprises N windings, a quantity of phases of each of the N windings is 2 or 3, and N is an integer greater than or equal to 2.

19. The electric vehicle according to claim 18, wherein each winding is connected to an output end of one of the DC-AC circuits.

* * * * *